(12) United States Patent
Kato

(10) Patent No.: US 9,578,238 B2
(45) Date of Patent: Feb. 21, 2017

(54) IMAGING APPARATUS, IMAGING CONTROL METHOD AND STORAGE MEDIUM

(71) Applicant: CASIO COMPUTER CO., LTD., Shibuya-ku, Tokyo (JP)

(72) Inventor: Yoshiyuki Kato, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 17 days.

(21) Appl. No.: 14/596,917

(22) Filed: Jan. 14, 2015

(65) Prior Publication Data

US 2015/0207993 A1    Jul. 23, 2015

(30) Foreign Application Priority Data

Jan. 23, 2014 (JP) ................. 2014-010004

(51) Int. Cl.
*H04N 5/232* (2006.01)
*H04N 5/235* (2006.01)
*H04N 5/77* (2006.01)
*H04N 5/907* (2006.01)
*H04N 9/804* (2006.01)
(Continued)

(52) U.S. Cl.
CPC ........ *H04N 5/23245* (2013.01); *G02B 27/017* (2013.01); *H04N 5/2353* (2013.01); *H04N 5/23248* (2013.01); *H04N 5/23258* (2013.01); *H04N 5/33* (2013.01); *H04N 5/772* (2013.01); *H04N 5/907* (2013.01); *H04N 9/806* (2013.01); *H04N 9/8042* (2013.01); *G02B 2027/014* (2013.01); *G02B 2027/0129* (2013.01);
(Continued)

(58) Field of Classification Search
None
See application file for complete search history.

(56) References Cited

U.S. PATENT DOCUMENTS

| 2010/0182442 | A1* | 7/2010 | Maeng | H04N 5/232 348/220.1 |
| 2011/0063118 | A1* | 3/2011 | Sato | H04N 1/00127 340/635 |
| 2015/0163407 | A1* | 6/2015 | Khoury | G11B 27/02 348/208.5 |

FOREIGN PATENT DOCUMENTS

| JP | 2009118135 A | 5/2009 |
| JP | 2013247639 A | 12/2013 |

OTHER PUBLICATIONS

Japanese Office Action (and English translation thereof) dated Oct. 27, 2015, issued in counterpart Japanese Application No. 2014-010004.

* cited by examiner

*Primary Examiner* — Roberto Velez
*Assistant Examiner* — Quan Pham
(74) *Attorney, Agent, or Firm* — Holtz, Holtz & Volek PC

(57) ABSTRACT

In the present invention, in interval shooting, a CPU of an imaging apparatus controls to repeatedly record images sequentially captured by an imaging section as a moving image at predetermined timing. This CPU controls to select to record an image captured by the imaging section as a still image or to select to record images sequentially captured by the imaging section as a moving image, in accordance with the movement of the imaging apparatus based on a detection result of an acceleration sensor or the movement of a photographic subject from images captured by the imaging section or a detection result of an infrared sensor. That is, when there is a possibility of motion blur or camera shake, (Continued)

moving image capturing is switched to still image photographing and a still image is recorded.

8 Claims, 2 Drawing Sheets

(51) Int. Cl.
    *G02B 27/01*     (2006.01)
    *H04N 5/33*     (2006.01)
    *H04N 9/806*     (2006.01)
    *H04N 101/00*     (2006.01)
(52) U.S. Cl.
    CPC ................ *G02B 2027/0138* (2013.01); *G02B 2027/0198* (2013.01); *H04N 2101/00* (2013.01)

IMAGING APPARATUS, IMAGING CONTROL METHOD AND STORAGE MEDIUM

CROSS-REFERENCE TO RELATED APPLICATION

This application is based upon and claims the benefit of priority from the prior Japanese Patent Application No. 2014-010004, filed Jan. 23, 2014, the entire contents of which are incorporated herein by reference.

BACKGROUND OF THE INVENTION

1. Field of the Invention

The present invention relates to an imaging apparatus, an imaging control method and a storage medium.

2. Description of the Related Art

Conventionally, there has been proposed a head-mounted imaging apparatus that is worn on the head of a photographer, as described in Japanese Patent Application Laid-Open (Kokai) Publication No. 2013-247639.

By wearing the head-mounted imaging apparatus, the photographer can record a moving image of a subject in a viewing angle in his or her eye direction, or in other words, a moving image of his or her view itself without holding the imaging apparatus. Also, there has been proposed a technique in which short videos are captured at predetermined time intervals (interval shooting), and combined into one so as to be video content.

SUMMARY OF THE INVENTION

An object of the present invention is to achieve the recording of a stable video.

In order to achieve the above-described object, in accordance with one aspect of the present invention, there is provided an imaging apparatus comprising; an imaging section; a recording section which controls to record images captured by the imaging section; an acquiring section which acquires an imaging environment when recording by the recording section is started; and a record controlling section which controls the recording section to select to record an image captured by the imaging section as a still image or to select to record images sequentially captured by the imaging section as a moving image, based on the imaging environment acquired by the acquiring section.

In accordance with another aspect of the present invention, there is provided an imaging control method for an imaging apparatus including an imaging section, comprising: a recording step of controlling to record images captured by the imaging section; an acquiring step of acquiring an imaging environment when recording in the recording step is started; and a record controlling step of controlling to select to record an image captured by the imaging section as a still image or to select to record images sequentially captured by the imaging section as a moving image, based on the imaging environment acquired in the acquiring step.

In accordance with another aspect of the present invention, there is provided a non-transitory computer-readable storage medium having stored thereon a program that is executable by a computer in an imaging apparatus including an imaging section, the program being executable by the computer to perform functions comprising: recordation processing for controlling to record images captured by the imaging section; acquisition processing for acquiring an imaging environment when recording in the recordation processing is started; and recording control processing for controlling the recordation processing to select to record an image captured by the imaging section as a still image or to select to record images sequentially captured by the imaging section as a moving image, based on the imaging environment acquired in the acquisition processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of the present invention will hereinafter be described with reference to the drawings.

A. Structure of Embodiment

Figure 1:
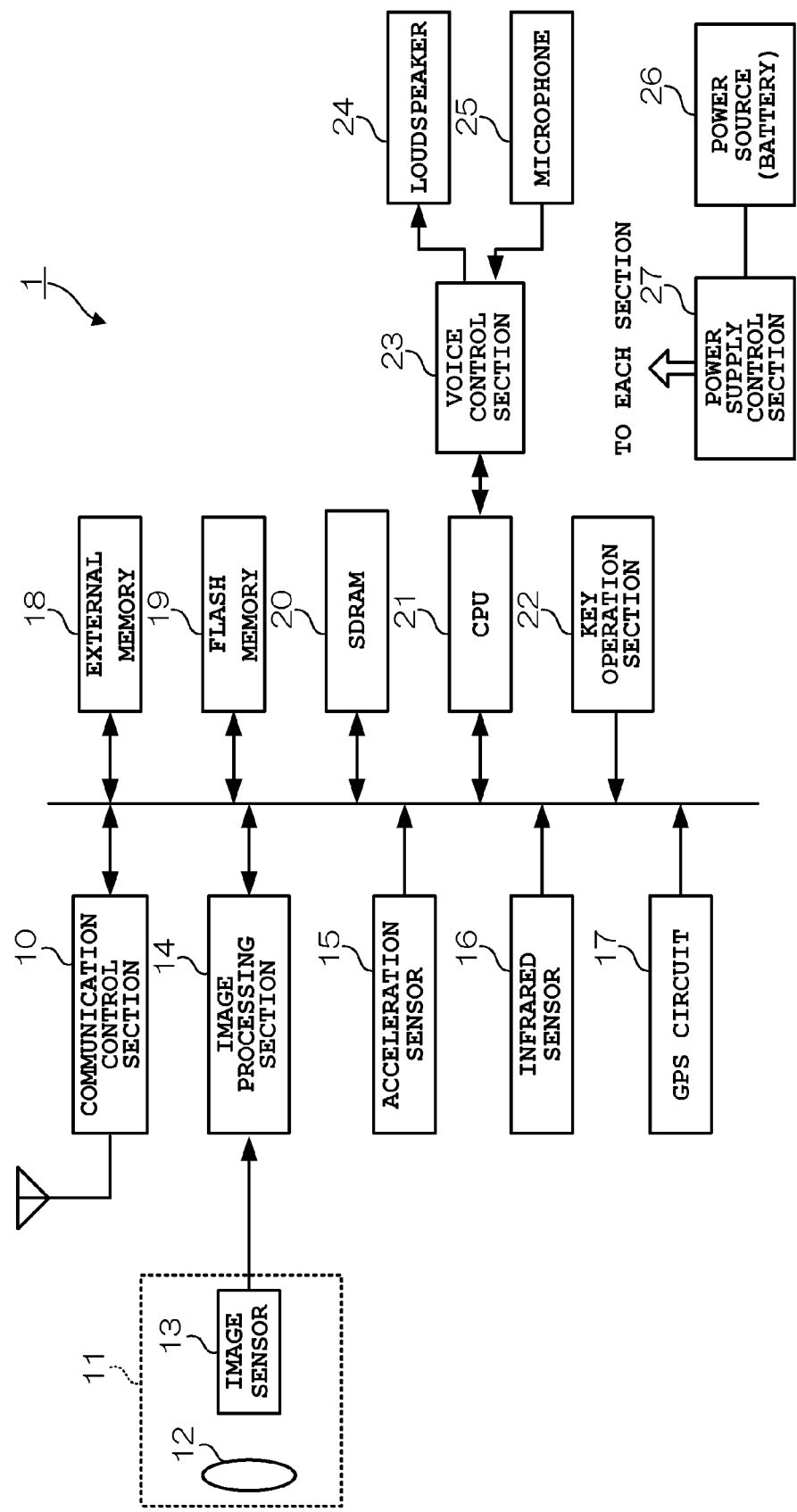
FIG. 1 is a block diagram showing the structure of a head-mounted imaging apparatus 1 according to an embodiment of the present invention.

FIG. 1 is a block diagram showing the structure of an imaging apparatus 1 according to an embodiment of the present invention. In FIG. 1, a head-mounted imaging apparatus 1 in FIG. 1 includes a communication control section 10, an imaging section 11, an image processing section 14, an acceleration sensor 15, an infrared sensor 16, a GPS (Global Positioning System) circuit 17, an external memory 18, a flash memory 19, a SDRAM (Synchronous Dynamic Random Access Memory) 20, a CPU (Central Processing Unit) 21, a key operation section 22, a voice control section 23, a loudspeaker 24, a microphone 25, a power source (battery) 26, and a power supply control section 27.

The communication control section 10 transfers captured image data (still images or moving images) to a server on the Internet, or to an information processing device such as a personal computer via the Internet, etc. This communication control section 10 can also transfer a live view image or images being recorded to an external replay/display apparatus via peer-to-peer communications. The imaging section 11 includes a lens block 12 constituted by an optical lens group and an image sensor 13 such as a CCD (Charge Coupled Device) or CMOS (Complementary Metal-Oxide Semiconductor). The image sensor 13 converts an image entering from the lens block 12 to a digital signal. The image processing section 14 performs image processing (such as pixel interpolation processing, γ correction, luminance color-difference signal generation, white balance processing, and exposure correction processing) and compression and expansion of image data (for example, compression and expansion of a JPEG (Joint Photographic Experts Group) format, Motion-JPEG format, or MPEG (Moving Picture Experts Group) format).

The acceleration sensor 15 detects the movement of the imaging apparatus 1 which is made in conjunction with the movement of a user's head. The CPU 21 judges whether the imaging apparatus 1 has been fixed (with a tripod) or has been handheld and determines the degree of camera shake from a detection result of the acceleration sensor 15. The infrared sensor 16 detects the movement of a photographic subject. The CPU 21 detects the movement of a photographic subject from images captured by the image sensor 13 or a detection result of the infrared sensor 16. The GPS circuit 17 acquires the positional information of the head-mounted imaging apparatus 1. In this embodiment, positional information acquired by the GPS circuit 17 is used to, for example, determine imaging timing for interval shooting.

The external memory 18 is a removable storage medium, and stores image data captured by the imaging section 11 and the like. The flash memory 19 is a storage medium for storing image data captured by the imaging section 11 and the like. The SDRAM 20 is used as a buffer memory for temporarily storing image data captured by the imaging section 11 and sent to the CPU 21, and is also used as a working memory for the CPU 21.

The CPU 21, which is a one-chip microcomputer for controlling each section of the head-mounted imaging apparatus 1, causes the imaging section 11 to perform still image photographing, starts and stops moving image recording, switches between still image photographing and moving image capturing, or the like. In particular, during interval shooting, the CPU 21 in this embodiment judges whether the imaging apparatus 1 has been fixed with a tripod or the like or has been handheld by the user, or in other words, judges whether or not in a state which has not been fixed with a tripod or the like, from a detection result of the acceleration sensor 15.

Also, during interval shooting, the CPU 21 judges the degree of camera shake from a detection result of the acceleration sensor 15.

Moreover, during interval shooting, the CPU 21 judges whether the photographic subject (target to be imaged) is moving or standing still from a comparison result between the frames of images captured by the image sensor 13 or a detection result of the infrared sensor 16.

Then, the CPU 21 of the present embodiment selects a moving image (such as a short video of five seconds) or a still image (high sensitivity/high-speed shutter) as contents imaged and recorded in the interval shooting, based on whether or not the imaging apparatus 1 has been fixed with a tripod or the like, the degree of the camera shake of the imaging apparatus 1, and whether the photographic subject is moving or standing still, and then controls to perform processing therefor. In still image photographing and recording, the CPU 21 photographs and records a less blurred image by changing imaging conditions (high sensitivity/high-speed shutter).

The key operating section 22 inputs an operation mode or an operation instruction for starting, pausing, or stopping image capturing in response to a touch operation from a user. The audio control section 23 converts audio (such as alarm sound) at the time of the playback of captured moving images to an analog signal and outputs it from the loudspeaker 24, under the control of the CPU 21. Also, the audio control section 23 digitalizes and captures environmental sound collected by the microphone 25 in moving image capturing. The power supply (battery) 26 is a rechargeable secondary battery. The power supply control section 27 stabilizes the output voltage of the power supply (battery) 26, and supplies driving electric power to each section.

B. Operation of Embodiment

Next, the operation of the present embodiment is described.

Figure 2:
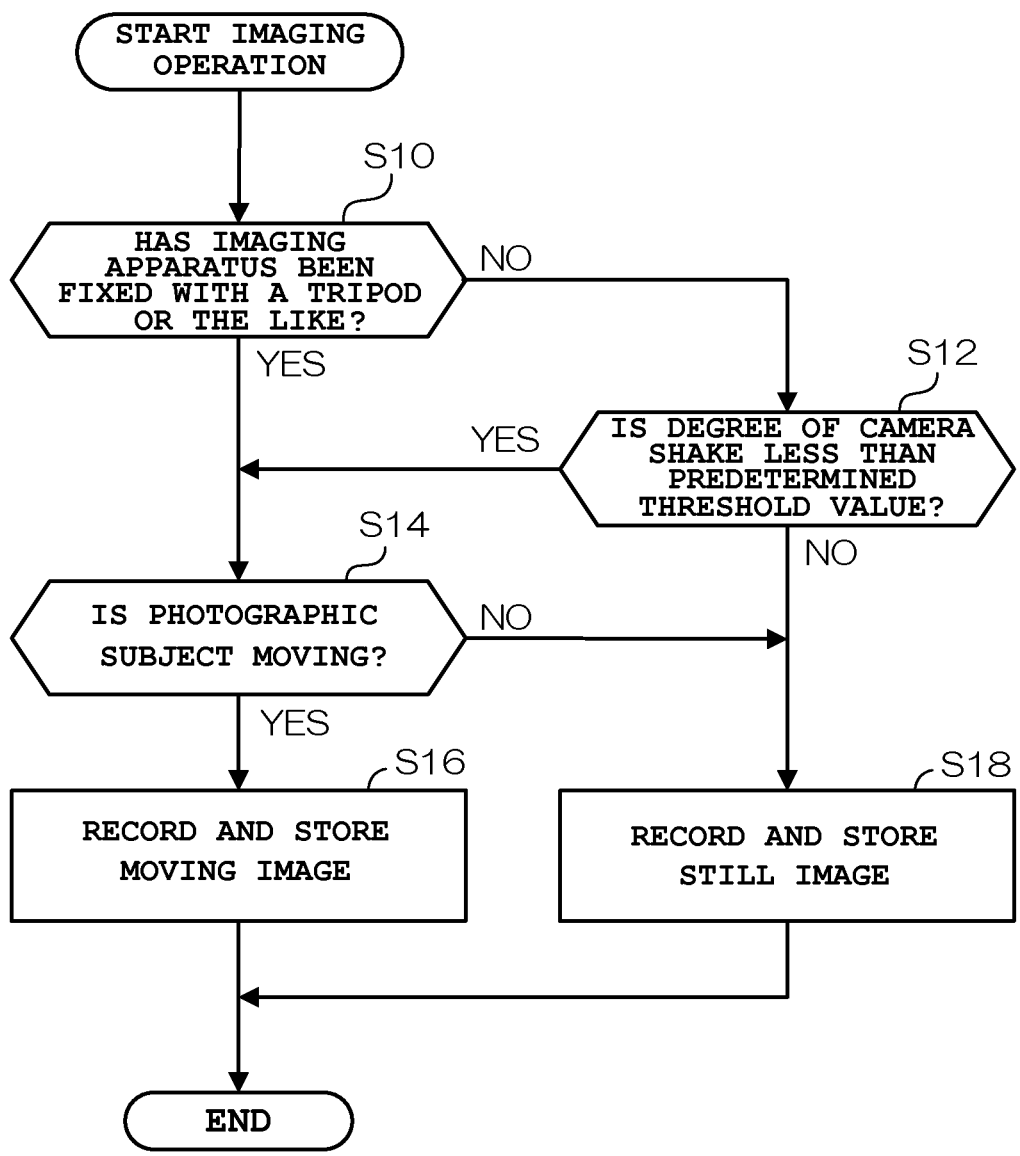
FIG. 2 is a flowchart for describing the operation of the imaging apparatus 1 of the embodiment.

FIG. 2 is a flowchart for describing the operation of the imaging apparatus 1 of the present embodiment.

When an interval shooting mode is set in the imaging apparatus 1, the timing of interval shooting comes by the trigger of interval shooting occurring at predetermined timing. As this trigger, time intervals (for example, every five minutes) or distance intervals (for example, every one kilometer) acquired from GPS information may be used. In addition, various triggers for automatic shooting may be used, such as a trigger that occurs when the imaging apparatus 1 is judged to be positioned in a specified area by use of GPS information, or a trigger that occurs when a signal is received from a communication device in an external device.

Then, when the timing of interval shooting comes, the CPU 21 judges whether the imaging apparatus 1 has been fixed with a tripod or the like or has been handheld by the user, or in other words, judges whether or not the imaging apparatus 1 has been fixed with a tripod or the like, based on information from the acceleration sensor 15 (Step S10).

When judged that the imaging apparatus 1 has been fixed with a tripod or the like (YES at Step S10), the CPU 21 judges whether a photographic subject (target to be imaged) is moving from images captured by the image sensor 13 or a detection result of the infrared sensor 16 (Step S14).

Specifically, when the value of the movement of the photographic subject is equal to or larger than a predetermined threshold value (second threshold value), the CPU 21 judges that the photographic subject is moving. Conversely, when the value of the movement of the photographic subject is less than the predetermined threshold value (second threshold value), the CPU 21 judges that the photographic subject is not moving, or in other words, standing still.

At Step S14, when judged that the photographic subject is moving (YES at Step S14), the CPU 21 controls the imaging section 11 to perform image capturing for five seconds, and stores image contents acquired by this five-second image capturing as a moving image (Step S16). By image capturing and recording being performed in this way, a moving image corresponding to the movement of the photographic subject can be captured with less camera shake and recorded. Then, the CPU 21 temporarily stops this processing until the next timing for interval shooting.

At Step S10 and Step S14, when judged that the imaging apparatus 1 has been fixed with a tripod or the like (YES at Step S10) and the photographic subject is not moving (NO at Step S14), the CPU 21 sets, as an imaging condition, a sensitivity higher than a normal sensitivity or a shutter speed faster than a normal shutter speed, and stores an image captured with this setting by the imaging section 11 as a still image (Step S18). By image capturing and recording being performed in this way, an unblurred still image can be stored. Then, the CPU 21 temporarily stops this processing until the next timing for interval shooting.

At Step S10, when judged that the imaging apparatus 1 has been handheld by the user, or in other words, the imaging apparatus 1 has not been fixed with a tripod or the like (NO at Step S10), the CPU 21 judges whether the degree of camera shake being applied to the imaging apparatus 1 is less than a predetermined threshold value (first threshold value) from a detection result of the acceleration sensor 15 (Step S12).

Then, when judged that the degree of the camera shake being applied to the imaging apparatus 1 is less than the predetermined threshold value (first threshold value) (YES at Step S12), the CPU 21 judges whether the photographic subject is moving from images captured by the image sensor 13 or a detection result of the infrared sensor 16 (Step S14). When judged that the photographic subject is moving (YES at Step S14), the CPU 21 controls the imaging section 11 to perform image capturing for five seconds, and stores image contents acquired by this five-second image capturing as a moving image (Step S16). That is, a moving image corresponding to the movement of the photographic subject is captured with less camera shake and recorded. Then, the CPU 21 temporarily stops this processing until the next timing for interval shooting.

At Step S12 and Step S14, when judged that the degree of the camera shake being applied to the imaging apparatus 1 is less than the predetermined threshold value (first threshold value) (YES at Step S12) and the photographic subject is standing still (NO at Step S14), the CPU 21 sets, as an imaging condition, a sensitivity higher than a normal sensitivity or a shutter speed faster than a normal shutter speed, and stores an image captured with this setting by the imaging section 11 as a still image (Step S18).

That is, an unblurred still image is stored. Then, the CPU 21 temporarily stops this processing until the next timing for interval shooting.

At Step S10 and Step S12, when judged that the imaging apparatus 1 has been handheld by the user, or in other words, the imaging apparatus 1 has not been fixed with a tripod or the like (NO at Step S10) and the degree of the camera shake being applied to the imaging apparatus 1 is equal to or larger than the predetermined threshold value (first threshold value) (NO at Step S12), the CPU 21 sets, as an imaging condition, a sensitivity higher than a normal sensitivity or a shutter speed faster than a normal shutter speed, and stores an image captured with this setting by the imaging section 11 as a still image (Step S18). That is, an unblurred still image is stored. Then, the CPU 21 temporarily stops this processing until the next timing for interval shooting.

Note that, when the imaging apparatus 1 has been fixed with a tripod or the like, camera shake does not easily occur, and therefore either moving image capturing or still image photographing is performed based on the movement of the photographic subject.

Here, when the photographic subject is moving, since camera shake does not occur and a varied scene can be captured, moving image capturing is performed. On the other hand, when the photographic subject is not moving, still image photographing is performed because an unvaried scene is captured even if moving image capturing is performed.

Also, when the imaging apparatus 1 has been handheld by the user, either moving image capturing or still image photographing is performed with reference to a predetermined acceptable range for the camera shake of the imaging apparatus 1. When the degree of the camera shake is out of the predetermined acceptable range, still image photographing is performed. Here, high-speed shutter imaging is performed with a high sensitivity. That is, still image photographing that avoids image blurring as much as possible is performed. By this operation, moving images that cause visually induced motion sickness due to substantial motion blur or panning of the imaging apparatus 1 can be avoided. When the degree of the camera shake is within the predetermined acceptable range, since the degree of the camera shake of the imaging apparatus 1 is low, moving image capturing is performed.

In interval shooting (moving image capturing) in the above-described embodiment, when there is a possibility of motion blur as a result of the detection of the changes of images sequentially captured by the imaging section 11, or when there is a possibility of camera shake as a result of the detection of the movement of the imaging section 11, the moving image capturing is switched to still image photographing and a still image is recorded. As a result of this configuration, a stable video can be recorded.

Also, in the above-described embodiment, a high sensitivity or high-speed shutter is set as a photographing condition, and then a still image is photographed and recorded. As a result of this configuration, a less blurred still image is recorded.

Note that, although only one image is photographed in still image photographing in the above-described embodiment, configuration where high-speed continuous imaging is performed and a plurality of still images are photographed and acquired may be adopted on the assumption that high-speed shutter imaging is performed.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
   an imaging device; and
   a processor which executes:
      setting processing to set an imaging condition of the imaging device;
      acquisition processing to acquire an imaging environment when image recording is started; and
      setting control processing to control to select one of setting an imaging condition suitable for still image imaging and setting an imaging condition suitable for moving image imaging, based on the imaging environment acquired in the acquisition processing,
   wherein the imaging environment includes a state in which a value of movement of the imaging device is equal to or larger than a first threshold value and a state in which the value of movement of the imaging device is less than the first threshold value; and
   wherein the processor further executes recording processing to record a captured image as a still image when the value of movement of the imaging device is equal to or lamer than the first threshold value, and to record sequentially captured images as a moving image when the value of the movement of the imaging device is less than the first threshold value.

2. The imaging apparatus according to claim 1, wherein the imaging environment is determined based on detection of movement of the imaging device.

3. The imaging apparatus according to claim 1, wherein, under the state in which the value of movement of the imaging device is less than the first threshold value, the imaging environment is further determined based on detection of a change in images continuously captured by the imaging device.

4. The imaging apparatus according to claim 3, wherein the processor further executes recording control processing to select to record sequentially captured images as a moving image when a value of the change in the images continuously captured by the imaging device is equal to or larger than a second threshold value, and to select to record a captured image as a still image when the value of the change in the images continuously captured by the imaging device is less than the second threshold value.

5. The imaging apparatus according to claim 3, wherein the processor further executes recording control processing to select to record a captured image as a still image when the value of the movement of the imaging device is equal to or larger than the first threshold value or a value of the change in the images continuously captured by the imaging section is less than a second threshold value, and to select to record sequentially captured images as a moving image when the value of the movement of the imaging section is less than the first threshold value or the value of the change in the images continuously captured by the imaging device is equal to or larger than the second threshold value.

6. The imaging apparatus according to claim 1, wherein the imaging device repeatedly performs image capturing at predetermined timings.

7. An imaging control method for an imaging apparatus including an imaging device, the method comprising:
    setting an imaging condition of the imaging device;
    acquiring an imaging environment when image recording is started; and
    controlling to select one of setting an imaging condition suitable for still image imaging and setting an imaging condition suitable for moving image imaging, based on the acquired imaging environment;
    wherein the imaging environment includes a state in which a value of movement of the imaging device is equal to or larger than a first threshold value and a state in which the value of movement of the imaging device is less than the first threshold value; and
    wherein a captured image is recorded as a still image when the value of movement of the imaging device is equal to or lamer than the first threshold value, and captured images are sequentially recorded as a moving image when the value of the movement of the imaging device is less than the first threshold value.

8. A non-transitory computer-readable storage medium having stored thereon a program that is executable by a computer in an imaging apparatus including an imaging device, the program being executable by the computer to perform functions comprising:
    setting an imaging condition of the imaging device;
    acquiring an imaging environment when image recording is started; and
    controlling to select one of setting an imaging condition suitable for still image imaging and setting an imaging condition suitable for moving image imaging, based on the acquired imaging environment;
    wherein the imaging environment includes a state in which a value of movement of the imaging device is equal to or larger than a first threshold value and a state in which the value of movement of the imaging device is less than the first threshold value; and
    wherein a captured image is recorded as a still image when the value of movement of the imaging device is equal to or lamer than the first threshold value, and captured images are sequentially recorded as a moving image when the value of the movement of the imaging device is less than the first threshold value.

* * * * *

UNITED STATES PATENT AND TRADEMARK OFFICE
CERTIFICATE OF CORRECTION

| | |
|---|---|
| PATENT NO. | : 9,578,238 B2 |
| APPLICATION NO. | : 14/596917 |
| DATED | : February 21, 2017 |
| INVENTOR(S) | : Yoshiyuki Kato |

It is certified that error appears in the above-identified patent and that said Letters Patent is hereby corrected as shown below:

In the Claims

Column 6, Line 40, delete "lamer" and insert --larger--.

Column 7, Line 26, delete "lamer" and insert --larger--.

Column 8, Line 22, delete "lamer" and insert --larger--.

Signed and Sealed this
Fourth Day of July, 2017

Joseph Matal
*Performing the Functions and Duties of the
Under Secretary of Commerce for Intellectual Property and
Director of the United States Patent and Trademark Office*